(12) United States Patent
Ishikawa et al.

(10) Patent No.: US 9,441,503 B2
(45) Date of Patent: Sep. 13, 2016

(54) WASTE HEAT UTILIZATION APPARATUS

(75) Inventors: Takayuki Ishikawa, Yokohama (JP); Shinichiro Mizoguchi, Atsugi (JP); Hiroyuki Nagai, Machida (JP); Riyako Iwahashi, Atsugi (JP); Satoshi Ogihara, Fujisawa (JP); Tomonori Haraguchi, Isesaki (JP)

(73) Assignee: SANDEN HOLDINGS CORPORATION, Isesaki-Shi (JP)

( * ) Notice: Subject to any disclaimer, the term of this patent is extended or adjusted under 35 U.S.C. 154(b) by 243 days.

(21) Appl. No.: 14/348,395

(22) PCT Filed: Aug. 14, 2012

(86) PCT No.: PCT/JP2012/070652
§ 371 (c)(1),
(2), (4) Date: Jul. 18, 2014

(87) PCT Pub. No.: WO2013/046969
PCT Pub. Date: Apr. 4, 2013

(65) Prior Publication Data
US 2015/0047351 A1    Feb. 19, 2015

(30) Foreign Application Priority Data

Sep. 30, 2011 (JP) ................. 2011-216765

(51) Int. Cl.
| | | |
|---|---|---|
| *F02G 3/00* | (2006.01) | |
| *F01K 23/00* | (2006.01) | |
| *F01K 23/06* | (2006.01) | |
| *F01K 25/00* | (2006.01) | |

(Continued)

(52) U.S. Cl.
CPC ............. *F01K 23/101* (2013.01); *F01D 15/02* (2013.01); *F01D 15/12* (2013.01); *F02G 5/02* (2013.01); *F02G 5/04* (2013.01); *F01P 2060/16* (2013.01); *F01P 2060/18* (2013.01); *Y02T 10/166* (2013.01)

(58) Field of Classification Search
CPC ...... F01K 23/101; F01D 15/02; F01D 15/12; F02G 5/02; F02G 5/04; F01P 2060/16; F01P 2060/18; Y02T 10/166
USPC .................................. 60/616, 618, 670–671
See application file for complete search history.

(56) References Cited

U.S. PATENT DOCUMENTS 4,117,344 A * 9/1978 Boerstler ................ F01K 13/02
290/40 C
7,341,438 B2 * 3/2008 Uno ....................... F01C 1/0246
418/183

(Continued)

FOREIGN PATENT DOCUMENTS

JP        2005-201067 A        7/2005
JP        2008274834 A    *  11/2008
(Continued)

*Primary Examiner* — Thai Ba Trieu
(74) *Attorney, Agent, or Firm* — Foley & Lardner LLP

(57) ABSTRACT

A waste heat utilization apparatus is provided with a Rankine cycle and a power transmission mechanism that transmits power regenerated by an expander to an engine. The power transmission mechanism includes an expander clutch that interrupts or permits the transmission of the power from the expander to the engine. The expander includes a rotational speed sensor that detects a rotational speed of the expander. An increase in friction of the expander is detected on the basis of an increase in the rotational speed of the expander detected by the rotational speed sensor when the expander clutch is disconnected.

8 Claims, 14 Drawing Sheets

(51) Int. Cl.
  *F01K 23/10* (2006.01)
  *F02G 5/04* (2006.01)
  *F01D 15/02* (2006.01)
  *F01D 15/12* (2006.01)
  *F02G 5/02* (2006.01)

(56) References Cited

U.S. PATENT DOCUMENTS

| | | | | |
|---|---|---|---|---|
| 7,347,673 | B2* | 3/2008 | Yamanouchi | F01C 1/0215 417/237 |
| 7,399,167 | B2* | 7/2008 | Iwanami | F01K 23/065 417/304 |
| 7,836,696 | B2* | 11/2010 | Uno | F01K 23/065 60/670 |
| 8,415,815 | B2* | 4/2013 | Wada | F02G 5/02 290/2 |
| 2010/0090476 | A1* | 4/2010 | Wada | F02G 5/02 60/597 |
| 2013/0056992 | A1* | 3/2013 | Wada | F02G 5/02 290/40 R |
| 2013/0134720 | A1* | 5/2013 | Fukasaku | F01K 23/02 60/671 |
| 2014/0134034 | A1* | 5/2014 | Nakamura | F01C 13/04 418/55.3 |
| 2014/0165562 | A1* | 6/2014 | Nagai | F01K 23/10 60/618 |
| 2014/0165567 | A1* | 6/2014 | Nagai | F01K 23/10 60/670 |
| 2014/0174087 | A1* | 6/2014 | Mizoguchi | F01K 23/065 60/670 |
| 2014/0208754 | A1* | 7/2014 | Nagai | F01K 23/10 60/655 |
| 2014/0250886 | A1* | 9/2014 | Mizoguchi | F01K 23/10 60/663 |
| 2014/0250889 | A1* | 9/2014 | Mizoguchi | F01K 23/10 60/670 |
| 2015/0023824 | A1* | 1/2015 | Nakamura | F01C 13/04 418/55.3 |
| 2015/0033743 | A1* | 2/2015 | Wada | F01C 20/26 60/670 |
| 2015/0033744 | A1* | 2/2015 | Wada | F01C 20/26 60/670 |
| 2015/0096297 | A1* | 4/2015 | Haraguchi | F01K 13/02 60/615 |
| 2015/0098845 | A1* | 4/2015 | Nakamura | F01C 13/04 417/366 |
| 2015/0107253 | A1* | 4/2015 | Haraguchi | F01K 13/02 60/660 |
| 2015/0176482 | A1* | 6/2015 | Haraguchi | F02G 5/00 60/605.1 |

FOREIGN PATENT DOCUMENTS

| | | |
|---|---|---|
| JP | 2010-101283 A | 5/2010 |
| JP | 2010-190185 A | 9/2010 |
| JP | 2010-198586 A | 9/2010 |
| JP | 2010-203284 A | 9/2010 |
| JP | 2011-012625 A | 1/2011 |

* cited by examiner

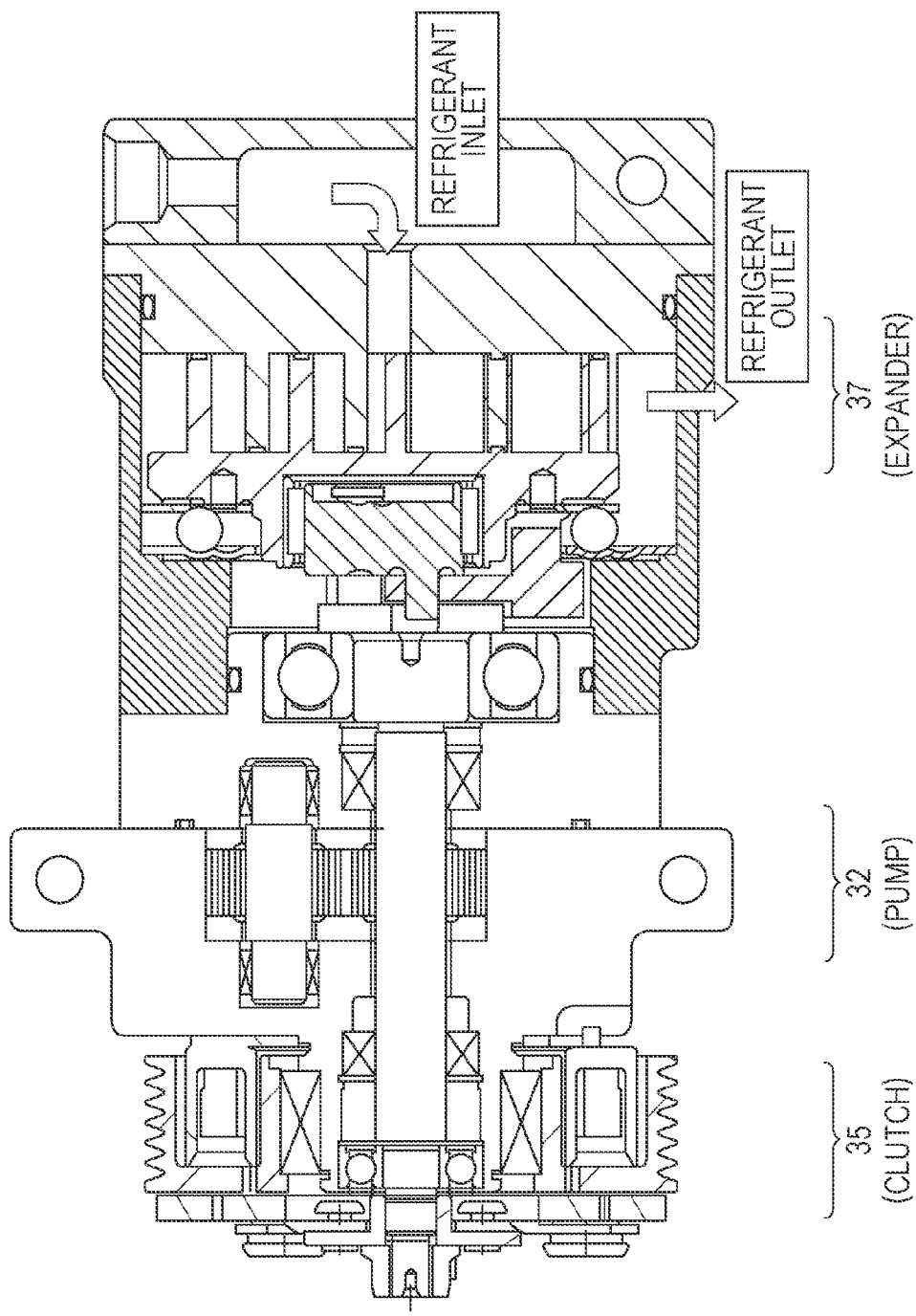

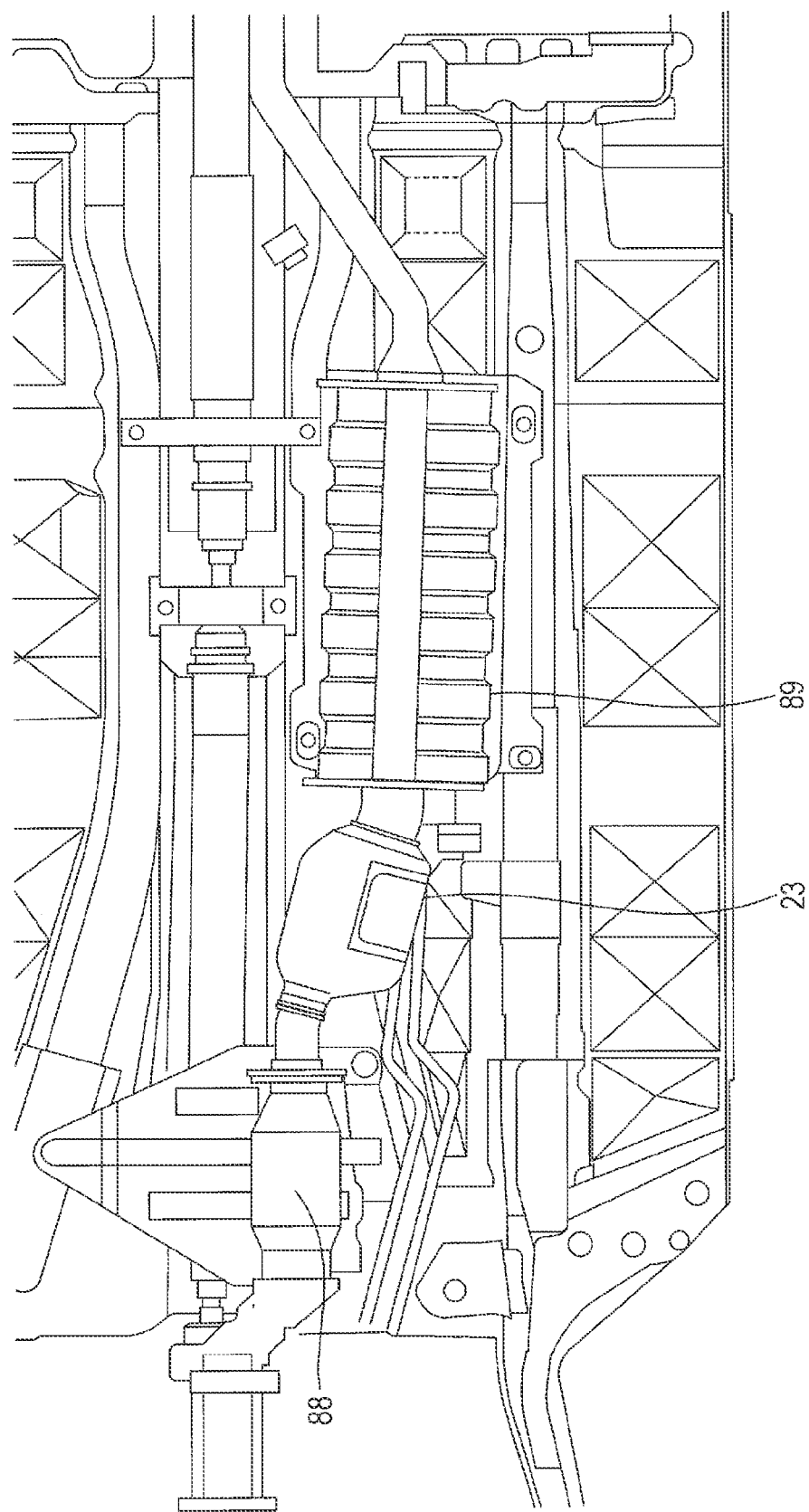

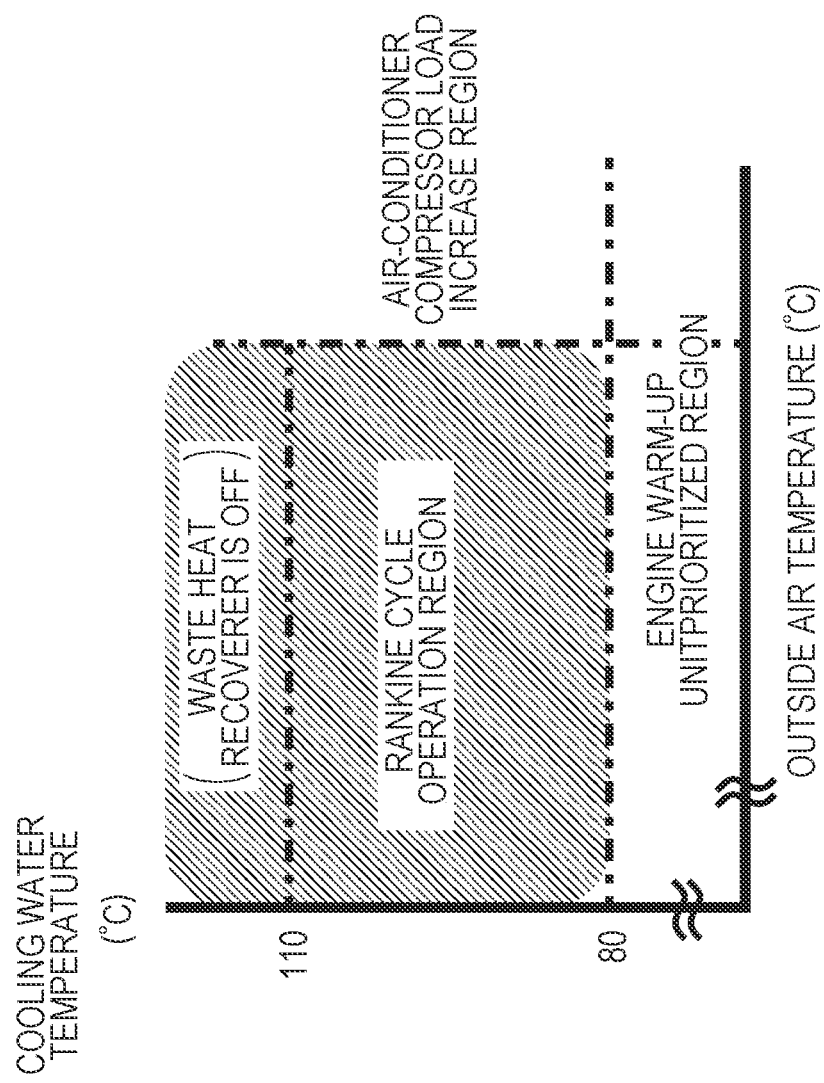

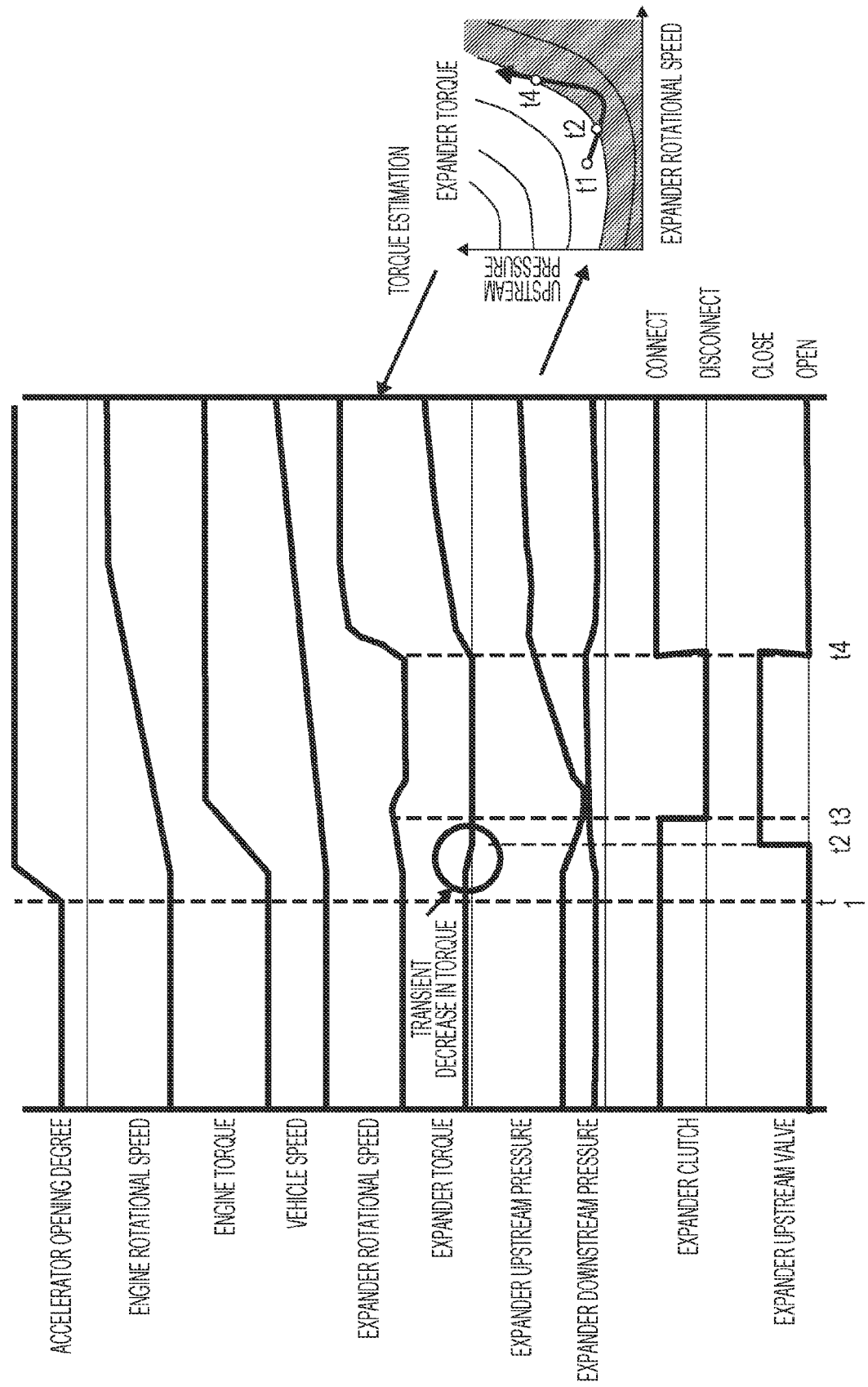

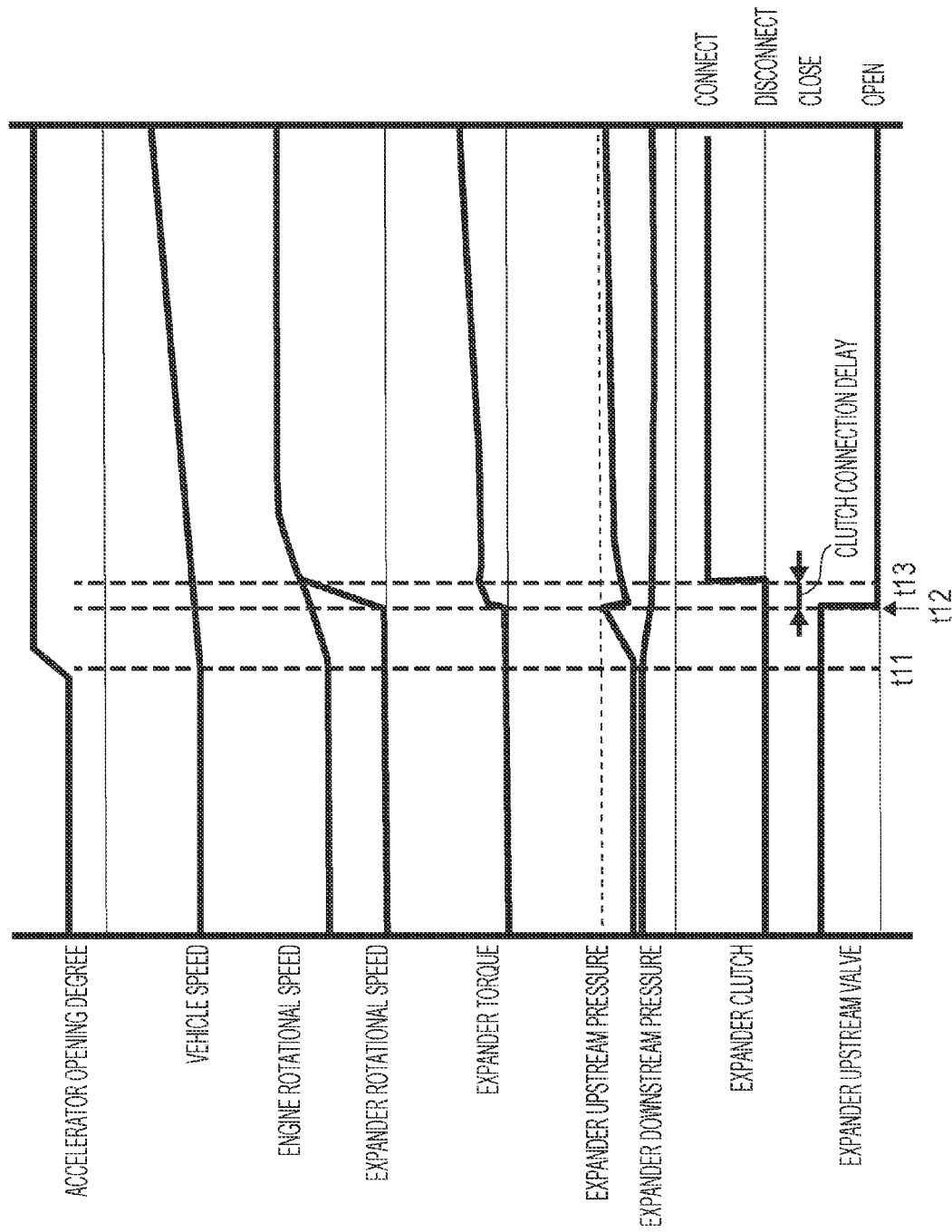

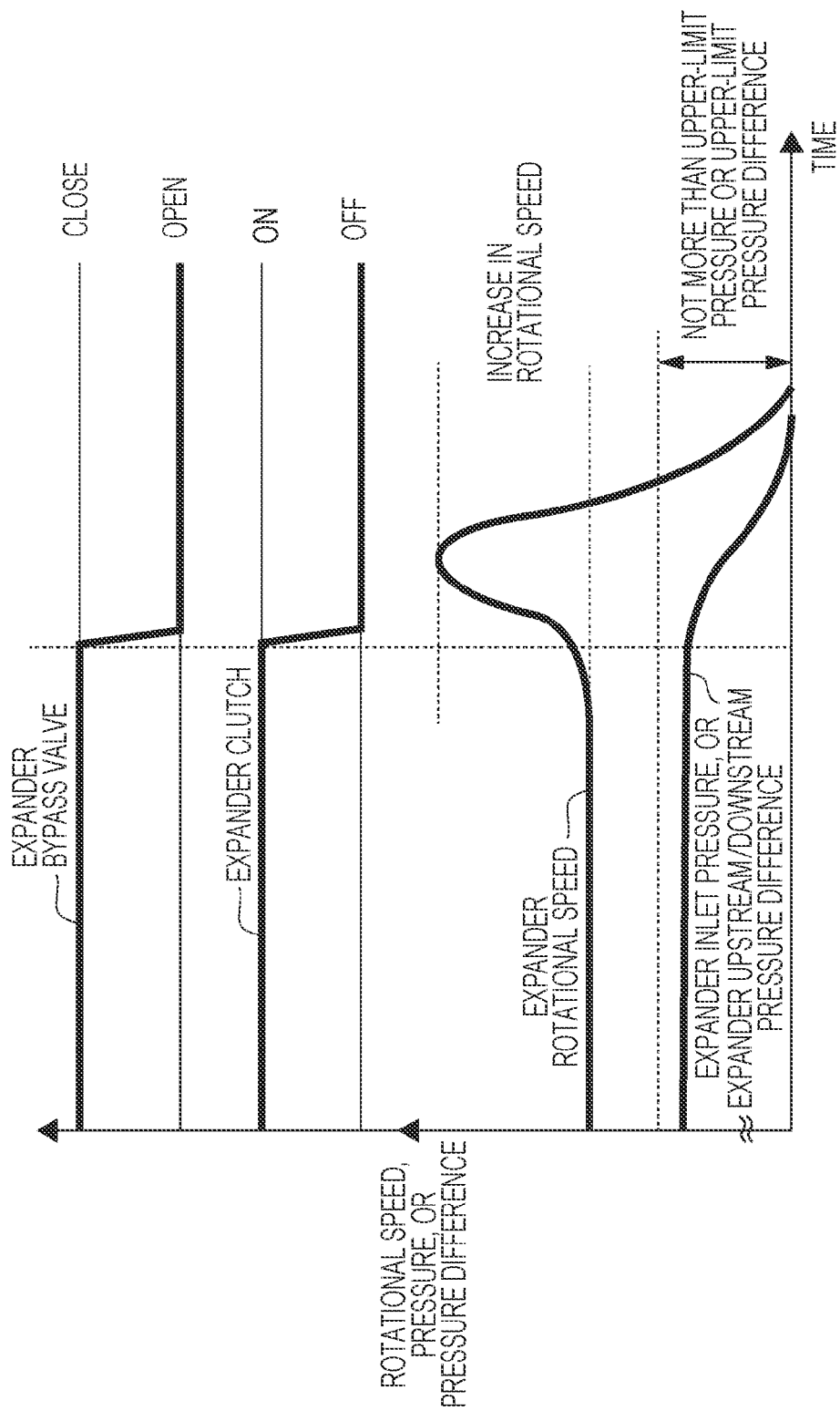

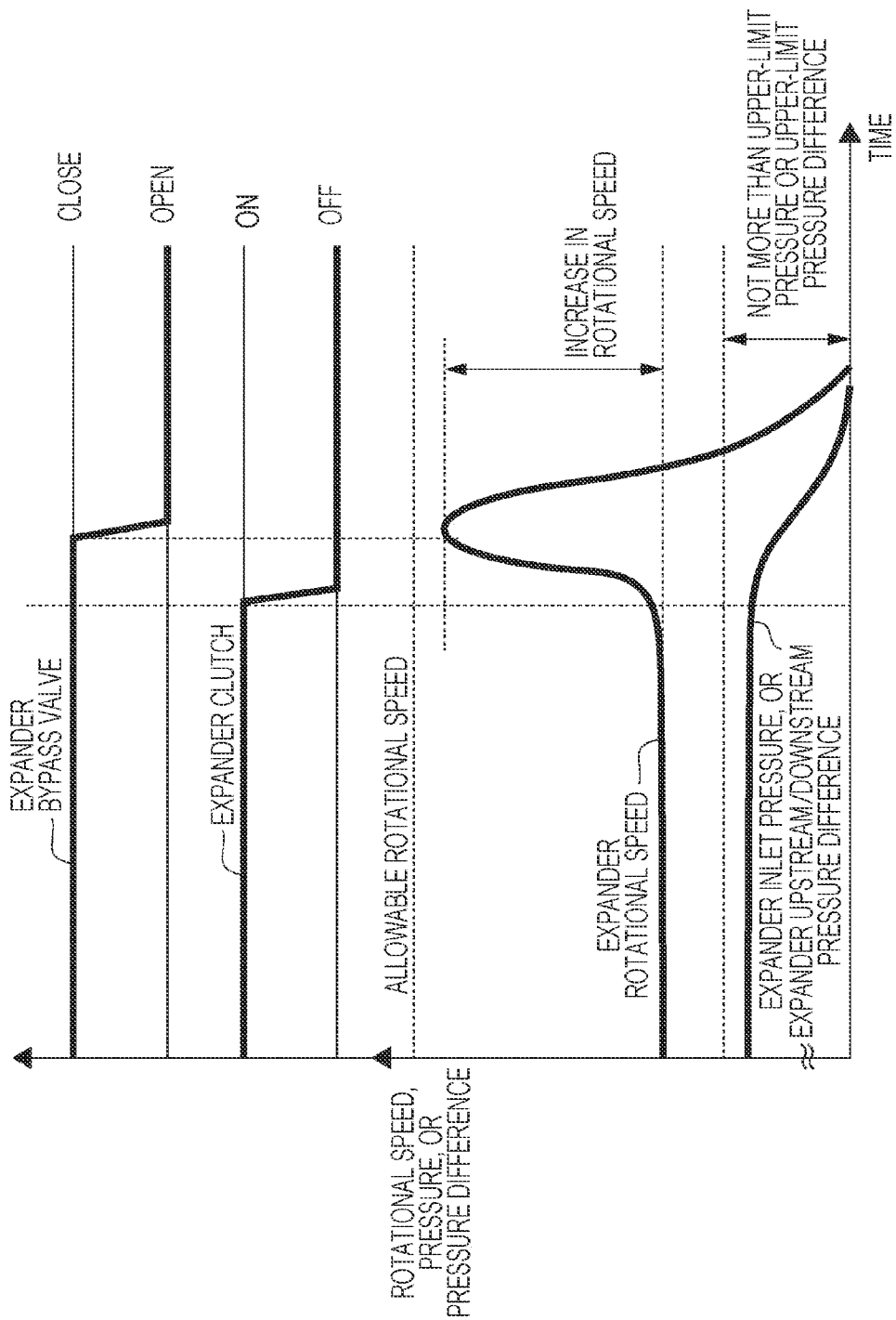

WASTE HEAT UTILIZATION APPARATUS

TECHNICAL FIELD

The present invention relates to a waste heat recovery system, particularly one integrating a Rankine cycle and a refrigeration cycle.

BACKGROUND ART

A Rankine cycle system in which engine waste heat is reused as energy is known. The engine waste heat is recovered, the Rankine cycle is operated with the waste heat, and rotational energy is produced by an expander (turbine). As an example of such system, a waste heat recovery apparatus has been disclosed (JP 2010-101283 A). The waste heat recovery apparatus is provided with a turbine that is driven by steam with which engine waste heat is recovered in a superheater, and with a power recovery means. The power recovery means includes a first pulley connected to the shaft of the turbine via an electromagnetic clutch, and a second pulley disposed on the crank shaft. The power recovery means recovers power from the turbine to the crank shaft via a belt extended across the first pulley and the second pulley. The waste heat recovery apparatus is also provided with an ECU that, when it is determined that the rotation of the turbine is excessive, adjusts the load on the shaft of the turbine by connecting the first pulley to the shaft of the turbine via the electromagnetic clutch.

SUMMARY OF INVENTION

In Patent Document 1 cited above, when it is determined that the rotation of the expander (turbine) is excessive, the electromagnetic clutch is fastened to stop the excessive rotation of the turbine.

Meanwhile, when the friction of the expander is increased, the efficiency of the Rankine cycle is decreased. Thus, a method for detecting an increase in expander friction is desired. Conventional technology does not disclose any measure of detecting the increase in expander friction.

While the increase in friction may be detected by using a torque sensor, such as a strain sensor, in the expander, this method inevitably leads to an increase in size of the expander due to the additional sensor, and there is the possibility of erroneous detection due to large temperature errors.

The present invention was made in view of the above problems, and an object of the present invention is to provide a waste heat recovery system that recovers engine waste heat and that can detect an increase in friction of the expander.

According to an embodiment of the present invention, a waste heat recovery system includes a Rankine cycle and a power transmission mechanism. The Rankine cycle includes a heat exchanger that recovers waste heat from an engine with a refrigerant, an expander that produces power by using the refrigerant that exits the heat exchanger, a condenser that condenses the refrigerant that exits the expander, and a refrigerant pump that supplies the refrigerant that exits the condenser to the heat exchanger. The power transmission mechanism transmits the power regenerated by the expander to the engine. The power transmission mechanism includes a disconnection/connection means that interrupts or permits the transmission of the power from the expander to the engine. The expander includes a rotational speed detection means that detects a rotational speed of the expander. The waste heat utilization apparatus further includes a friction increase detection means that detects an increase in friction of the expander on the basis of an increase in the rotational speed of the expander detected by the rotational speed detection means when the disconnection/connection means is disconnected.

An embodiment of the present invention and advantages of the present invention will be described in the following with reference to the attached drawings.

BRIEF DESCRIPTION OF DRAWINGS

FIG. 2A is a schematic cross-sectional view of an expander pump according to the embodiment of the present invention.

FIG. 6 is a schematic diagram of the hybrid vehicle according to the embodiment of the present invention as viewed from below.

FIG. 7A is a characteristics chart of a Rankine cycle operation region according to the embodiment of the present invention.

FIG. 8 is a timing chart of a case in which the hybrid vehicle accelerates while the rotation of an engine output shaft is being assisted with an expander torque according to the embodiment of the present invention.

FIG. 9 is a timing chart illustrating the restarting of the Rankine cycle from a stop of operation according to the embodiment of the present invention.

FIG. 10 is an explanatory chart of an operation for detecting an increase in friction of the expander.

FIG. 11 is an explanatory chart of another example of the operation for detecting the increase in friction of the expander.

DESCRIPTION OF EMBODIMENTS

Figure 1:
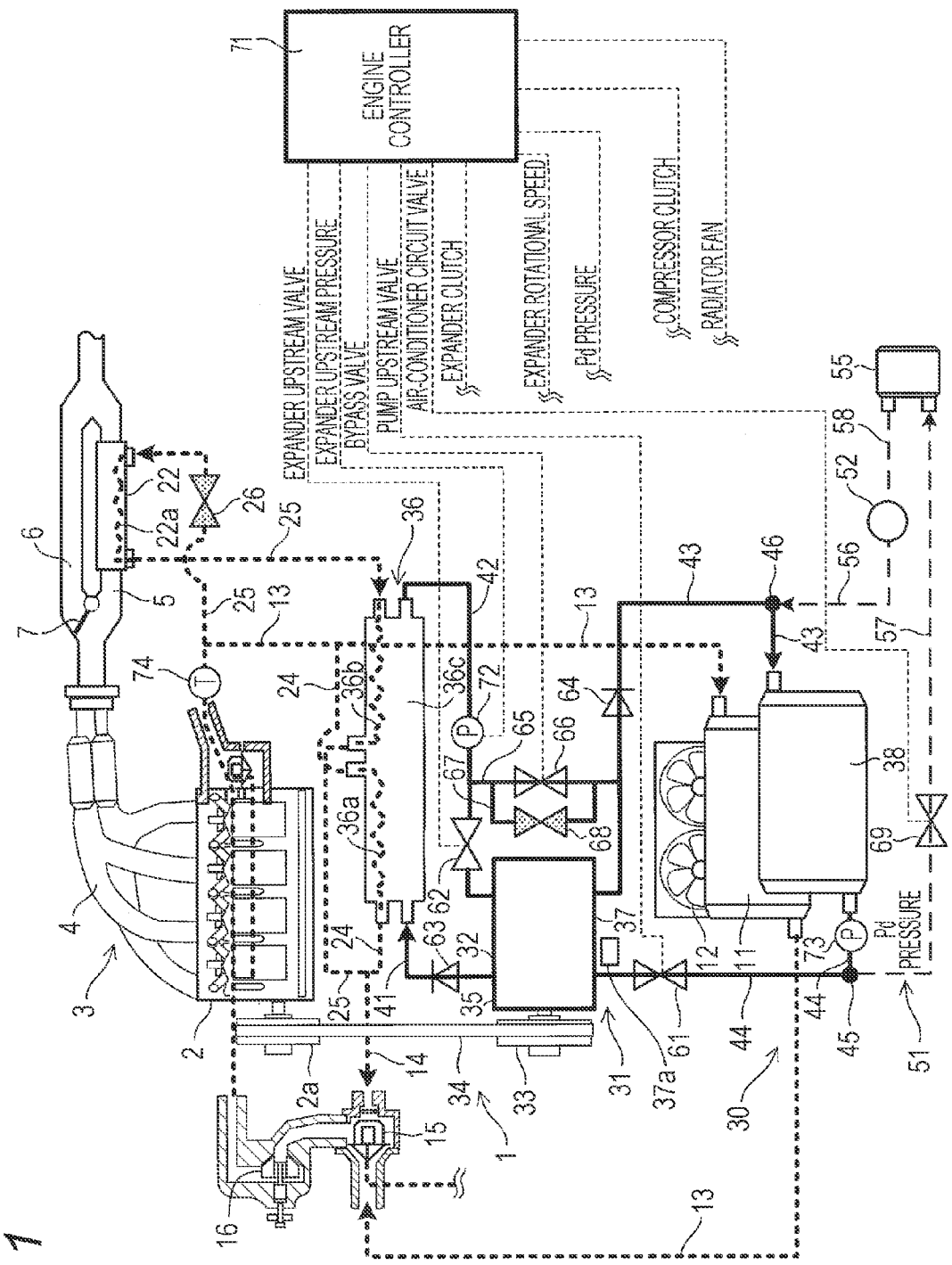
FIG. 1 is a schematic configuration diagram of an integrated cycle according to an embodiment of the present invention.
Figure 4:
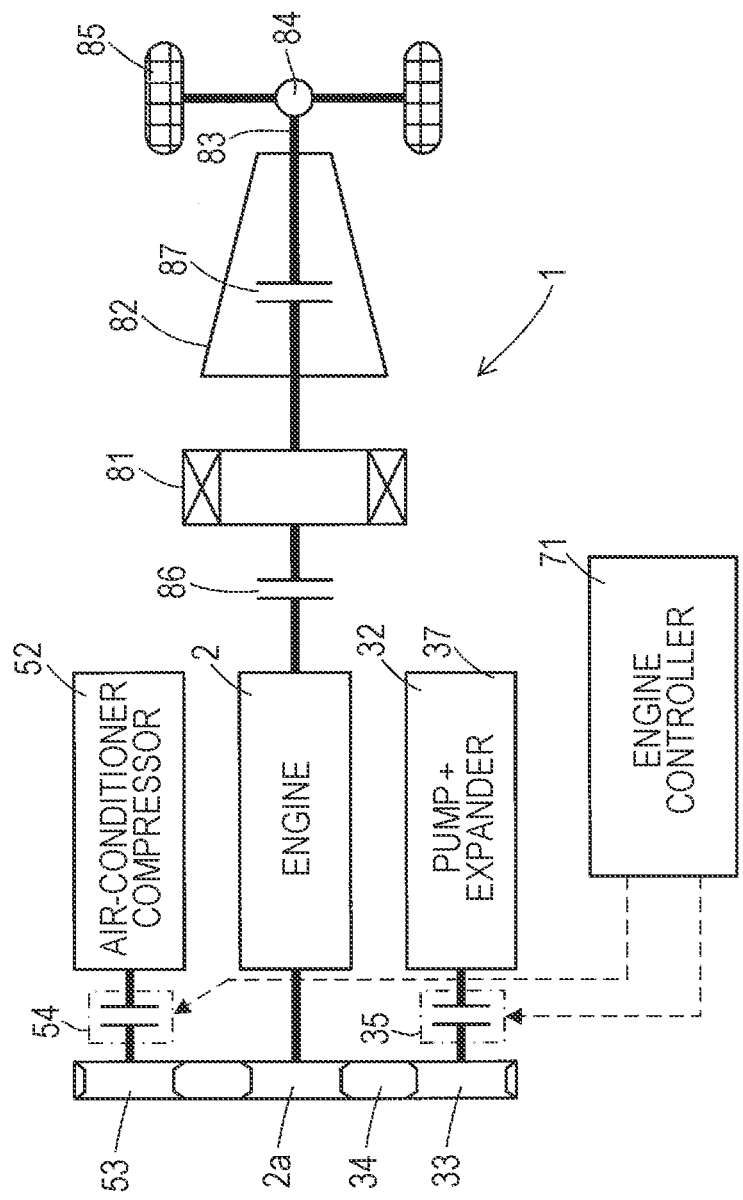
FIG. 4 is a schematic diagram of a hybrid vehicle according to the embodiment of the present invention.

FIG. 1 is a schematic diagram of a system as a whole of a Rankine cycle on which the present invention is based. In FIG. 1, the Rankine cycle 31 shares a refrigerant and a condenser 38 with a refrigeration cycle 51. A cycle that integrates the Rankine cycle 31 and the refrigeration cycle 51 will be hereafter referred to as an "integrated cycle 30". FIG. 4 is a schematic diagram of a hybrid vehicle 1 on which the integrated cycle 30 is mounted. The integrated cycle 30 refers to the system as a whole including cooling water and exhaust circuits (passages), as well as circuits (passages) through which the refrigerant is circulated between the Rankine cycle 31 and the refrigeration cycle 51, and constituent elements disposed at the middle of the circuits, such as a pump, an expander, and the condenser.

Figure 7B:
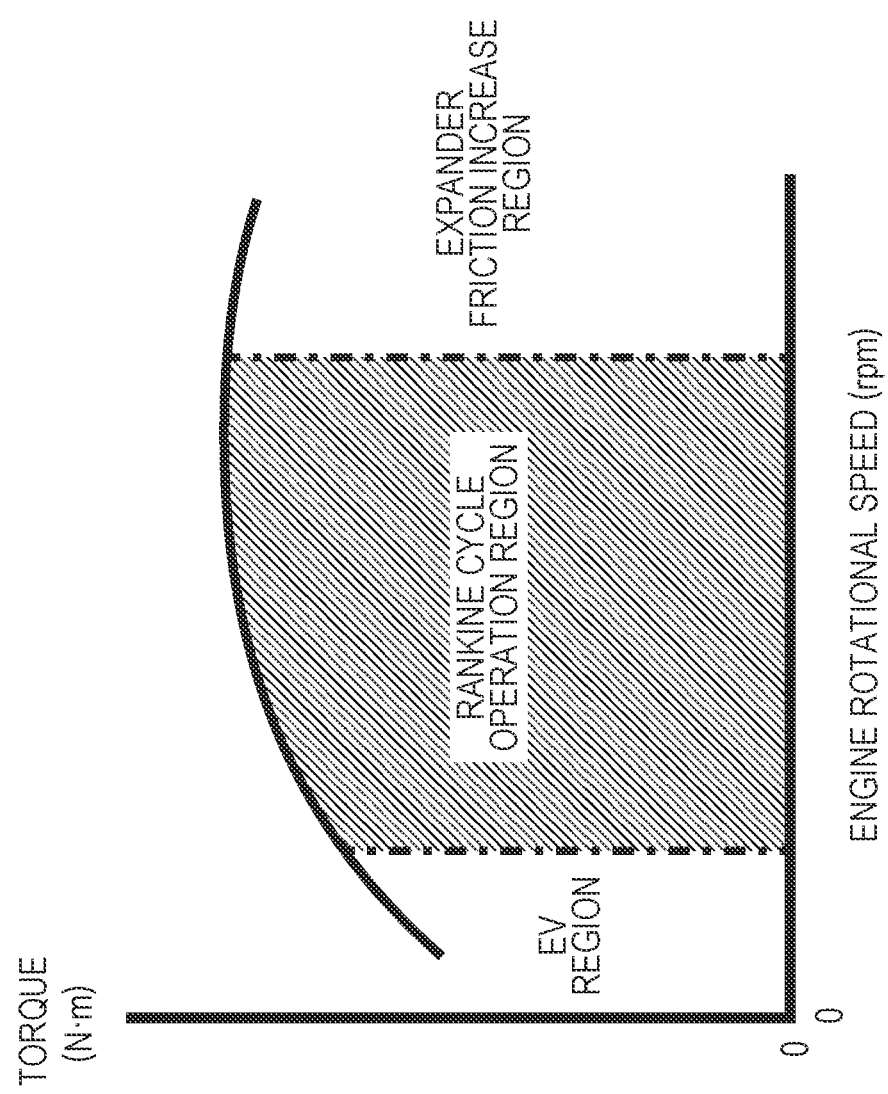
FIG. 7B is a characteristics chart of a Rankine cycle operation region according to the embodiment of the present invention

In the hybrid vehicle 1, an engine 2, a motor generator 81, and an automatic transmission 82 are connected in series. The output from the automatic transmission 82 is transmitted via a propeller shaft 83 and a differential gear 84 to drive wheels 85. Between the engine 2 and the motor generator 81, a first drive shaft clutch 86 is disposed. One of frictional fastening elements of the automatic transmission 82 is configured as a second drive shaft clutch 87. The first drive shaft clutch 86 and the second drive shaft clutch 87 are connected to an engine controller 71, and disconnection or connection (connection state) of the clutches is controlled depending on the driving condition of the hybrid vehicle. In the hybrid vehicle 1, as illustrated in FIG. 7B, when the vehicle speed is in an EV running region in which the efficiency of the engine 2 is low, the engine 2 is stopped and the first drive shaft clutch 86 is disconnected while the second drive shaft clutch 87 is connected. Thus, the hybrid vehicle 1 runs only on the driving force from the motor generator 81. When the vehicle speed moves out of the EV running region and transitions into the Rankine cycle operation region, the engine 2 is operated to operate the Rankine cycle 31 (as will be described below). The engine 2 is provided with an exhaust passage 3. The exhaust passage 3 includes first and second exhaust manifolds 4, and an exhaust pipe 5 connected to a converging portion of the first and second exhaust manifolds 4. The exhaust pipe 5 branches at a point into a bypass exhaust pipe 6. The exhaust pipe 5 in a section thereof bypassed by the bypass exhaust pipe 6 is provided with a waste heat recoverer 22 for exchanging heat between exhaust and the cooling water. The waste heat recoverer 22 and the bypass exhaust pipe 6 are integrated into a waste heat recovery unit 23 disposed between an underfloor catalyst 88 and a sub-muffler 89 further downstream, as illustrated in FIG. 6.

With reference to FIG. 1, an engine cooling water circuit will be described. The cooling water of approximately 80° C. to 90° C. exits the engine 2 and flows separately into a cooling water passage 13 passing through a radiator 11 and a bypass cooling water passage 14 that bypasses the radiator 11. Thereafter, the two flows join again in a thermostat valve 15 that determines the allocation of the volume of the cooling water that flows through the passages 13 and 14. The combined flow then returns to the engine 2 via a cooling water pump 16. The cooling water pump 16 is driven by the engine 2 while the rotational speed of the cooling water pump 16 is synchronized with the engine rotational speed. When the cooling water temperature is high, the valve opening degree of the thermostat valve 15 is increased on the side of the cooling water passage 13 so as to relatively increase the amount of cooling water that passes through the radiator 11. When the cooling water temperature is low, the valve opening degree of the thermostat valve 15 is decreased on the side of the cooling water passage 13 so as to relatively decrease the amount of cooling water passing through the radiator 11. When the cooling water temperature is particularly low, such as before the engine 2 is warmed up, the radiator 11 is completely bypassed so that the entire amount of cooling water can flow on the side of the bypass cooling water passage 14. Meanwhile, the valve opening degree on the side of the bypass cooling water passage 14 is never fully closed. When the flow volume of the cooling water flowing in the radiator 11 is increased, the flow volume of the cooling water flowing in the bypass cooling water passage 14 is decreased compared with when the entire amount of the cooling water flows on the side of the bypass cooling water passage 14. However, the thermostat valve 15 is configured such that the flow in the bypass cooling water passage 14 is not completely stopped. The bypass cooling water passage 14 bypassing the radiator 11 includes a first bypass cooling water passage 24 that branches from the cooling water passage 13 and that is directly connected to a heat exchanger 36 which will be described below. The bypass cooling water passage 14 also includes a second bypass cooling water passage 25 that branches from the cooling water passage 13 and that is connected to the heat exchanger 36 via the waste heat recoverer 22.

The bypass cooling water passage 14 is provided with the heat exchanger 36. The heat exchanger 36 exchanges heat between the cooling water and the refrigerant of the Rankine cycle 31. The heat exchanger 36 integrates an evaporator and a superheater. In the heat exchanger 36, two cooling water passages 36a and 36b are disposed substantially in a row. A refrigerant passage 36c in which the refrigerant of the Rankine cycle 31 flows is disposed adjacent to the cooling water passages so that the refrigerant and the cooling water can exchange heat. The passages 36a, 36b, and 36c are configured such that, when the heat exchanger 36 as a whole is viewed generally from above, the directions of flows of the refrigerant of the Rankine cycle 31 and the cooling water are opposite to each other.

Specifically, one of the cooling water passages, 36a, that is positioned on the upstream side (left in FIG. 1) for the refrigerant of the Rankine cycle 31 is disposed in the path of the first bypass cooling water passage 24. The left-side portion of the heat exchanger including the cooling water passage 36a and a refrigerant passage portion adjacent to the cooling water passage is the evaporator. The evaporator heats the refrigerant of the Rankine cycle 31 that flows in the refrigerant passage 36c by introducing the cooling water that exits the engine 2 directly into the cooling water passage 36a.

Into the other cooling water passage 36b positioned on the downstream side (right of FIG. 1) for the refrigerant of the Rankine cycle 31, the cooling water that passes through the waste heat recoverer 22 via the second bypass cooling water passage 25 is introduced. The right portion of the heat exchanger (the downstream side for the refrigerant of the Rankine cycle 31) including the cooling water passage 36b and the refrigerant passage portion adjacent to the cooling water passage 36b is the superheater. The superheater is used for superheating the refrigerant that flows in the refrigerant passage 36c by introducing the cooling water at the outlet of the engine 2, which is additionally heated by the exhaust, into the cooling water passage 36b.

The cooling water passage 22a of the waste heat recoverer 22 is disposed adjacent to the exhaust pipe 5. By introducing the cooling water at the outlet of the engine 2 into the cooling water passage 22a of the waste heat recoverer 22, the cooling water can be heated to temperatures of approximately 110° C. to 115° C., for example, by the high temperature exhaust. The cooling water passage 22a is configured such that, when the waste heat recoverer 22 as a whole is viewed from above, the directions of flows of the exhaust and the cooling water are opposite to each other.

In the path of the second bypass cooling water passage 25 provided with the waste heat recoverer 22, a control valve 26 is disposed. As will be described below, when the temperature detected by a cooling water temperature sensor 74 at the outlet of the engine has a predetermined value or higher, the opening degree of the control valve 26 is decreased. This is to prevent the engine water temperature, indicating the temperature of the cooling water inside the engine 2, from exceeding an allowable temperature (for example, 100° C.) for preventing deterioration in the efficiency of the engine 2 or the occurrence of knocking. When the engine water temperature approaches the allowable temperature, the amount of cooling water that passes through the waste heat recoverer 22 is decreased, so that the engine water temperature can be reliably prevented from exceeding the allowable temperature.

On the other hand, in a case where, due to a decrease in flow volume in the second bypass cooling water passage 25, the temperature of the cooling water is excessively increased by the waste heat recoverer 22 and evaporated (boiled), the flow of cooling water in the cooling water passage is adversely affected, and the temperatures of components may become excessively high. In order to avoid this, the bypass exhaust pipe 6 for bypassing the waste heat recoverer 22 is disposed. A thermostat valve 7 for controlling the amount of passage of exhaust through the waste heat recoverer 22 and the amount of passage of exhaust through the bypass exhaust pipe 6 is disposed at the branching portion of the bypass exhaust pipe 6. The valve opening degree of the thermostat valve 7 is adjusted on the basis of the temperature of the cooling water that exits the waste heat recoverer 22 so that the temperature of the cooling water that exits the waste heat recoverer 22 does not exceed a predetermined temperature (for example, a boiling temperature of 120° C.).

The heat exchanger 36, the thermostat valve 7, and the waste heat recoverer 22 are integrated as the waste heat recovery unit 23, which is disposed at the middle of the exhaust pipe under the floor at substantially the center in the vehicle width direction.

When the temperature of the cooling water flowing from the bypass cooling water passage 14 toward the thermostat valve 15 is sufficiently decreased by the exchange of heat with the refrigerant of the Rankine cycle 31 in the heat exchanger 36, for example, the valve opening degree of the thermostat valve 15 on the side of the cooling water passage 13 is decreased. In this way, the amount of cooling water that passes through the radiator 11 is relatively decreased. Conversely, when the temperature of the cooling water flowing from the bypass cooling water passage 14 toward the thermostat valve 15 is increased due to the absence of operation of the Rankine cycle 31, for example, the valve opening degree of the thermostat valve 15 on the side of the cooling water passage 13 is increased. As a result, the amount of cooling water that passes through the radiator 11 is relatively increased. On the basis of such operation of the thermostat valve 15, the temperature of the cooling water for the engine 2 is appropriately maintained while heat is appropriately supplied (recovered) to the Rankine cycle 31.

The Rankine cycle 31 will be described. The Rankine cycle 31 is not a simple Rankine cycle but configured as a part of the integrated cycle 30 integrating the refrigeration cycle 51. In the following, the Rankine cycle 31 as a basis will be described first, followed by a description of the refrigeration cycle.

The Rankine cycle 31 is a system for recovering the waste heat of the engine 2 with the refrigerant via the cooling water of the engine 2, and for regenerating the recovered waste heat as power. The Rankine cycle 31 is provided with a refrigerant pump 32, the heat exchanger 36 as the superheater, an expander 37 and the condenser 38. The respective constituent elements are connected by refrigerant passages 41 to 44 in which the refrigerant (such as R134a) is circulated.

Figure 2B:
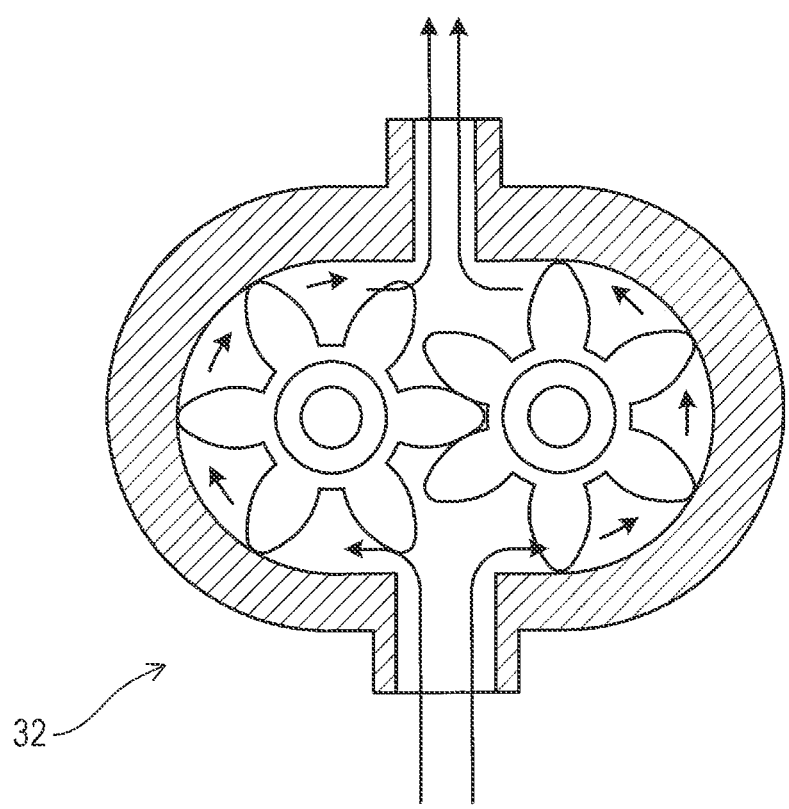
FIG. 2B is a schematic cross-sectional view of a refrigerant pump according to the embodiment of the present invention.
Figure 2C:
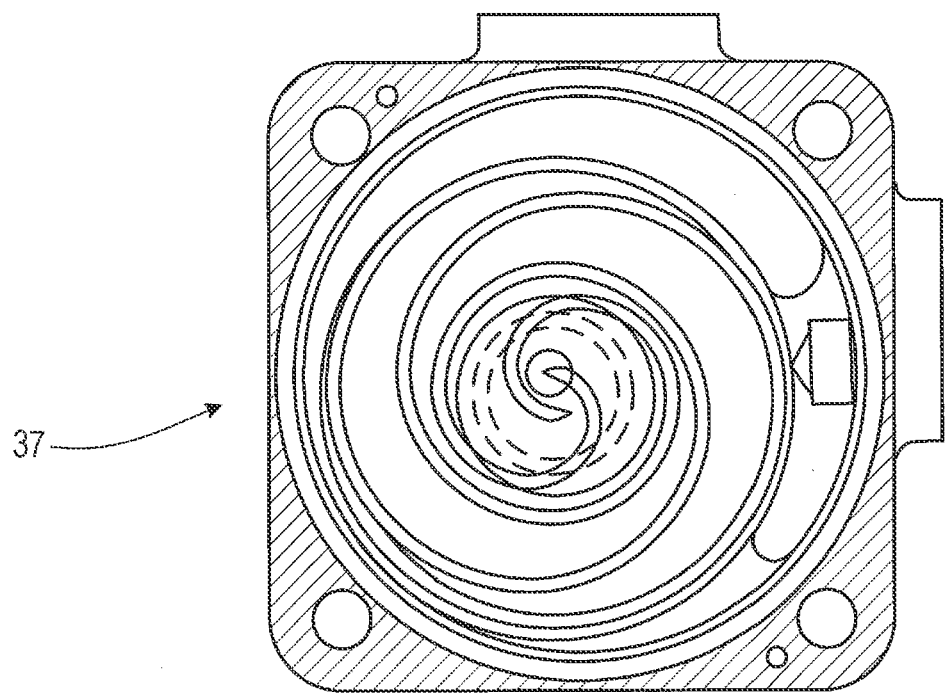
FIG. 2C is a schematic cross-sectional view of an expander according to the embodiment of the present invention.

The shaft of the refrigerant pump 32 is coaxially connected to the output shaft of the expander 37. The refrigerant pump 32 is driven by the output (power) produced by the expander 37 while the produced power is supplied to the output shaft (crank shaft) of the engine 2 (see FIG. 2A). The shaft of the refrigerant pump 32 and the output shaft of the expander 37 are disposed in parallel with the output shaft of the engine 2, with a belt 34 extended between a pump pulley 33 at the end of the shaft of the refrigerant pump 32 and a crank pulley 2a (see FIG. 1). According to the present embodiment, the refrigerant pump 32 is a geared pump, and the expander 37 is a scrolling expander (see FIGS. 2B and 2C). The expander 37 is provided with a rotational speed sensor 37a for detecting the expander rotational speed, i.e., the rotational speed of the expander 37.

Between the pump pulley 33 and the refrigerant pump 32, an electromagnetic clutch (hereafter referred to as an "expander clutch") 35 is disposed to enable the refrigerant pump 32 and the expander 37 to be connected to or disconnected from the engine 2 (see FIG. 2A). When the output produced by the expander 37 exceeds the driving force of the refrigerant pump 32 and the friction of the rotating body (i.e., when a predicted expander torque is positive), the expander clutch 35 is connected to assist the rotation of the engine output shaft with the output produced by the expander 37. By thus assisting the rotation of the engine output shaft with the energy obtained by waste heat recovery, fuel economy can be improved. The energy for driving the refrigerant pump 32 for circulating the refrigerant may also be provided by the recovered waste heat. The expander clutch 35 may be disposed anywhere in the middle of the power transmission path from the engine 2 to the refrigerant pump 32 and the expander 37.

The refrigerant from the refrigerant pump 32 is supplied to the heat exchanger 36 via the refrigerant passage 41. The heat exchanger 36 is a heat exchanger for exchanging heat between the cooling water for the engine 2 and the refrigerant, and for vaporizing and superheating the refrigerant.

The refrigerant from the heat exchanger 36 is supplied via the refrigerant passage 42 to the expander 37. The expander 37 is a steam turbine that converts heat into rotational energy by expanding the vaporized and superheated refrigerant. The power recovered by the expander 37 is used to drive the refrigerant pump 32, and is also transmitted to the engine 2 via the belt transmission mechanism to assist the rotation of the engine 2.

The refrigerant from the expander 37 is supplied via the refrigerant passage 43 to the condenser 38. The condenser 38 is a heat exchanger that exchanges heat between the outside air and the refrigerant so as to cool and liquefy the refrigerant. The condenser 38 is disposed in parallel with the radiator 11 and cooled by a radiator fan 12.

The refrigerant liquefied by the condenser 38 is returned via the refrigerant passage 44 to the refrigerant pump 32. The refrigerant returned to the refrigerant pump 32 is sent back to the heat exchanger 36 by the refrigerant pump 32 and is circulated through the constituent elements of the Rankine cycle 31.

Next, the refrigeration cycle 51 will be described. The refrigeration cycle 51 is integrated with the Rankine cycle 31 in order to share the refrigerant circulated in the Rankine cycle 31. The configuration of the refrigeration cycle 51 itself is simple. The refrigeration cycle 51 is provided with a compressor 52, the condenser 38, and an evaporator 55.

The compressor 52 is a fluid machine for compressing the refrigerant in the refrigeration cycle 51 to high temperature and pressure, and is driven by the engine 2. As also illustrated in FIG. 4, a compressor pulley 53 is fixed on the drive shaft of the compressor 52, and the belt 34 is extended across the compressor pulley 53 and the crank pulley 2a. The driving force of the engine 2 is transmitted via the belt 34 to the compressor pulley 53 to drive the compressor 52. Between the compressor pulley 53 and the compressor 52, an electromagnetic clutch (hereafter referred to as a "compressor clutch") 54 is disposed to enable disconnection or connection of the compressor 52 and the compressor pulley 53.

Returning to FIG. 1, the refrigerant from the compressor 52 joins the refrigerant passage 43 via a refrigerant passage 56, and is then supplied to the condenser 38. The condenser 38 is a heat exchanger that condenses and liquefies the refrigerant by exchanging heat with the outside air. The liquid refrigerant from the condenser 38 is supplied to the evaporator 55 via a refrigerant passage 57 branching from the refrigerant passage 44. The evaporator 55 is disposed within the same casing of an air-conditioner unit in which a heater core, not shown, is disposed. The evaporator 55 is a heat exchanger for cooling air-conditioned air from a blower fan with evaporative latent heat produced by evaporating the liquid refrigerant from the condenser 38.

The refrigerant evaporated by the evaporator 55 is returned via a refrigerant passage 58 to the compressor 52. A mixture ratio of the air-conditioned air cooled by the evaporator 55 and the air-conditioned air heated by the heater core is modified in accordance with the opening degree of an air mixing door so that a temperature set by the passenger can be achieved.

The evaporator 55, a part of the refrigerant passage 44 connecting the condenser 38 and the evaporator 55, and the refrigerant passage 57 are disposed at positions higher than the inlet of the refrigerant pump 32. The refrigerant passage 44 branches from a refrigeration cycle branch point 45 and is connected to the refrigerant passage 57.

The integrated cycle 30 including the Rankine cycle 31 and the refrigeration cycle 51 is provided with various valves as needed at the middle of the circuit in order to control the refrigerant that flows in the cycle. For example, in order to control the refrigerant circulated in the Rankine cycle 31, the refrigerant passage 44 connecting the refrigeration cycle branch point 45 and the refrigerant pump 32 is provided with a pump upstream valve 61. The refrigerant passage 42 connecting the heat exchanger 36 and the expander 37 is provided with an expander upstream valve 62. The refrigerant passage 41 connecting the refrigerant pump 32 and the heat exchanger 36 is provided with a check valve 63 for preventing the backflow of refrigerant from the heat exchanger 36 to the refrigerant pump 32. The refrigerant passage 43 connecting the expander 37 and a refrigeration cycle junction point 46 is also provided with a check valve 64 for preventing the backflow of refrigerant from the refrigeration cycle junction point 46 to the expander 37. An expander bypass passage 65 bypasses the expander 37 from upstream of the expander upstream valve 62 and joins the upstream of the check valve 64. The expander bypass passage 65 is provided with an expander bypass valve 66. The expander bypass valve 66 is bypassed by a passage 67 which is provided with a pressure adjusting valve 68. Also, on the side of the refrigeration cycle 51, the refrigerant passage 57 connecting the refrigeration cycle branch point 45 and the evaporator 55 is provided with an air-conditioner circuit valve 69.

The above four valves 61, 62, 66, and 69 are all electromagnetic on-off valves. A signal of an expander upstream pressure detected by the pressure sensor 72, a signal of a refrigerant pressure Pd detected at the outlet of the condenser detected by the pressure sensor 73, an expander rotational speed detection signal detected by the rotational speed sensor 37a, and the like are inputted to the engine controller 71. The engine controller 71 controls the compressor 52 of the refrigeration cycle 51 and the radiator fan 12 in accordance with a predetermined driving condition and on the basis of the respective input signals, while also controlling the opening and closing of the above four electromagnetic on-off valves 61, 62, 66, and 69.

For example, the engine controller 71 predicts an expander torque (regenerative power) on the basis of the expander upstream pressure detected by the pressure sensor 72 and the expander rotational speed detected by the rotational speed sensor 37a. When the predicted expander torque is positive (i.e., when the rotation of the engine output shaft can be assisted), the engine controller 71 causes the expander clutch 35 to be fastened. When the predicted expander torque is zero or negative, the engine controller 71 causes the expander clutch 35 to be released. Based on the pressure detected by the sensor and the expander rotational speed, the expander torque can be predicted with higher accuracy than when the expander torque (regenerative power) is predicted from the exhaust temperature. Thus, the expander clutch 35 can be fastened or released appropriately in accordance with the status of generation of expander torque (see JP 2010-190185 A for detail).

The above four on-off valves 61, 62, 66, and 69 and the two check valves 63 and 64 are refrigerant system valves. The functions of these refrigerant system valves are again illustrated in FIG. 3.

Figure 3:
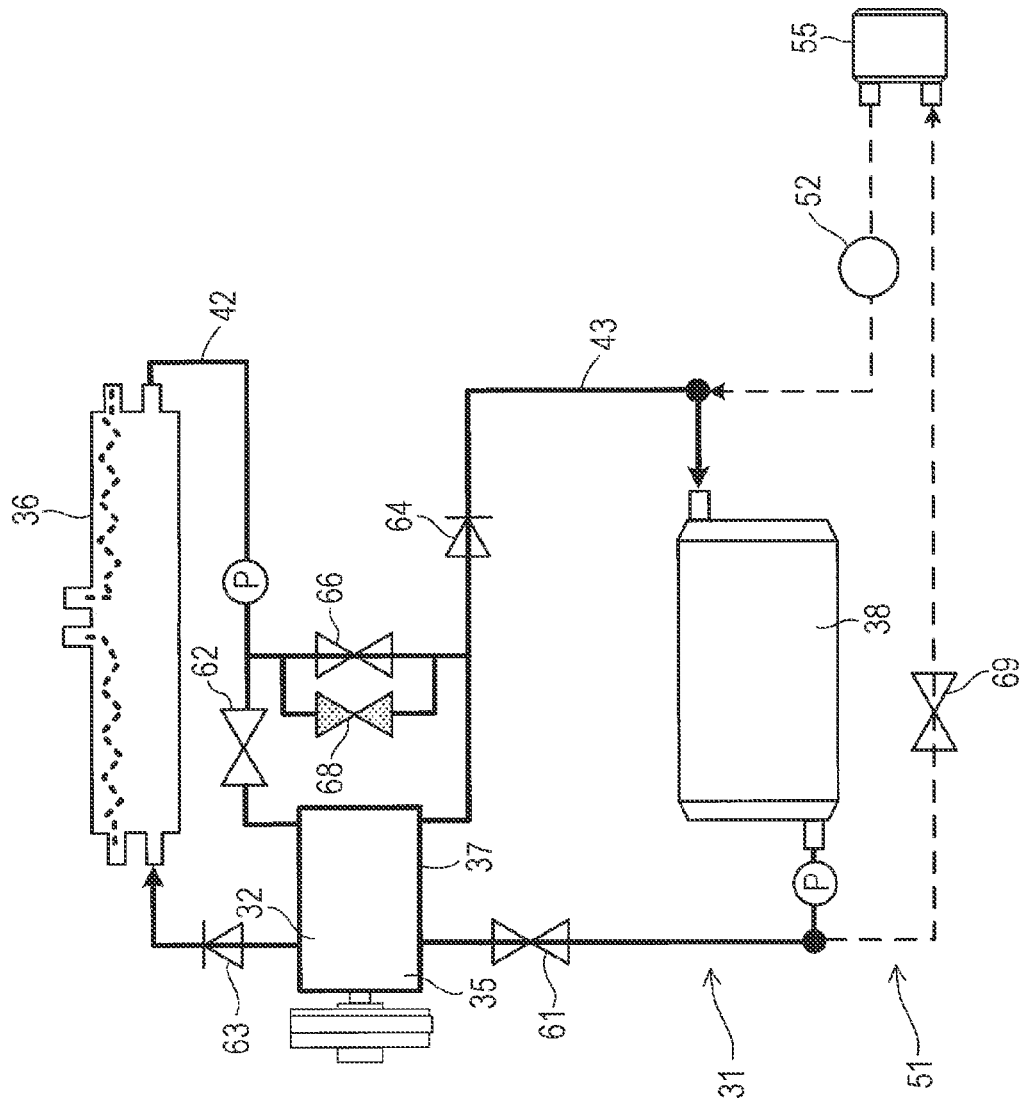
FIG. 3 is a schematic diagram illustrating the function of a refrigerant system valve according to the embodiment of the present invention.

In FIG. 3, the pump upstream valve 61 is disposed at the inlet of the refrigerant pump 32. The pump upstream valve 61 is closed under a predetermined condition such that the refrigerant tends to unevenly exist in the circuit of the Rankine cycle 31 compared with the circuit of the refrigeration cycle 51. This is in order to prevent uneven existence of the refrigerant (including a lubricant component) toward the Rankine cycle 31. Specifically, as will be described below, the pump upstream valve 61 closes the circuit of the Rankine cycle 31 in cooperation with the check valve 64 downstream of the expander 37. The expander upstream valve 62 is configured to close the refrigerant passage 42 when the refrigerant pressure from the heat exchanger 36 is relatively low, and to keep the passage 42 closed until the refrigerant from the heat exchanger 36 has high pressure. Thus, even when a sufficient expander torque cannot be obtained, heating of the refrigerant can be promoted, and the time before the Rankine cycle 31 is restarted (i.e., regeneration can be actually performed), for example, can be decreased. When, for example, the amount of refrigerant present on the side of the Rankine cycle 31 at the time of starting the Rankine cycle 31 is not sufficient, the expander bypass valve 66 is opened to activate the refrigerant pump 32 while the expander 37 is bypassed. Thus, the expander bypass valve 66 decreases the starting time of the Rankine cycle 31. When, by activating the refrigerant pump 32 while the expander 37 is bypassed, the refrigerant temperature at the outlet of the condenser 38 or the inlet of the refrigerant pump 32 is decreased from a boiling point determined by the pressure at that portion by a predetermined temperature difference (degree of subcooling SC) or more, liquid refrigerant can be sufficiently supplied to the Rankine cycle 31.

The check valve 63 disposed upstream of the heat exchanger 36 is operated to maintain the refrigerant supplied to the expander 37 at high pressure in cooperation with the upstream expander bypass valve 66, the pressure adjusting valve 68, and the expander upstream valve 62. Under a condition such that the regeneration efficiency of the Rankine cycle is low, the operation of the Rankine cycle is stopped and the circuit is closed across the section of the heat exchanger. Thus, the refrigerant pressure during the stop is increased so that the Rankine cycle can be rapidly restarted by using the high pressure refrigerant. The pressure adjusting valve 68 has the role of a relief valve for releasing the refrigerant when the pressure of the refrigerant supplied to the expander 37 is too high.

The check valve 64 downstream of the expander 37 is used for preventing an uneven existence of the refrigerant toward the Rankine cycle 31 in cooperation with the pump upstream valve 61. Immediately after the start of operation of the hybrid vehicle 1 when the engine 2 is not warmed up, the temperature of the Rankine cycle 31 may become lower than the temperature of the refrigeration cycle 51. As a result, the refrigerant may become unevenly exist on the side of the Rankine cycle 31. The probability of the uneven existence toward the Rankine cycle 31 is not so high. However, immediately after the start of operation of the vehicle in summer, for example, the vehicle interior may need to be cooled rapidly and may require the maximum cooling performance. In such a case, it is desirable to ensure the refrigerant in the refrigeration cycle 51 by eliminating even a slight uneven existence of the refrigerant. Thus, the check valve 64 is disposed to prevent the uneven existence of refrigerant toward the Rankine cycle 31.

The compressor 52 is configured to prevent an uneven existing of the refrigerant toward the refrigeration cycle 51 in cooperation with the air-conditioner circuit valve 69, rather than being structured such that the refrigerant can freely pass through when deactivated, as will be described below. When the operation of the refrigeration cycle 51 is stopped, the refrigerant may move from the Rankine cycle 31 in steady operation with relatively high temperature toward the refrigeration cycle 51, resulting in a lack of refrigerant circulating through the Rankine cycle 31. In the refrigeration cycle 51, immediately after the stopping of cooling, the temperature of the evaporator 55 is low, so that the refrigerant tends to accumulate in the evaporator 55 with a relatively large volume and high temperature. In this case, the movement of refrigerant from the condenser 38 toward the evaporator 55 is blocked by deactivating the compressor 52, while the air-conditioner circuit valve 69 is closed. In this way, the uneven existing of the refrigerant toward the refrigeration cycle 51 is prevented.

Figure 5:
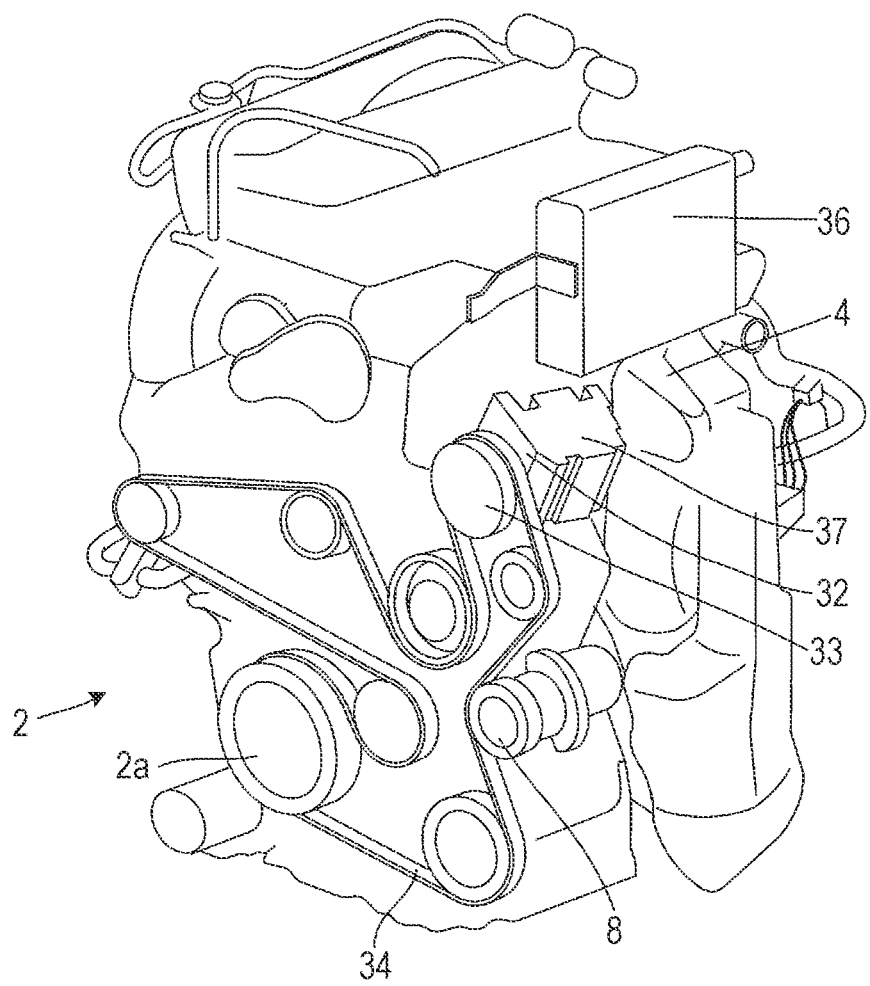
FIG. 5 is a schematic perspective view of an engine according to the embodiment of the present invention.

FIG. 5 is a schematic perspective view of the engine 2 illustrating the package of the engine as a whole. In FIG. 5, the heat exchanger 36 is characteristically disposed vertically above the exhaust manifold 4. When the heat exchanger 36 is disposed in a space vertically above the exhaust manifold 4, the mountability of the Rankine cycle 31 on the engine 2 is improved. The engine 2 is fitted with a tension pulley 8.

Next, a basic method of operation of the Rankine cycle 31 will be described with reference to FIGS. 7A and 7B.

FIGS. 7A and 7B are operation region charts of the Rankine cycle 31. FIG. 7A illustrates the Rankine cycle operation region with the horizontal axis showing the outside air temperature and the vertical axis showing the engine water temperature (cooling water temperature). FIG. 7B illustrates the Rankine cycle 31 operation region with the horizontal axis showing the engine rotational speed and the vertical axis showing the engine torque (engine load).

In each of FIGS. 7A and 7B, the Rankine cycle 31 is operated when a predetermined condition is satisfied. Thus, the Rankine cycle 31 is operated when both conditions are satisfied. In FIG. 7A, the operation of the Rankine cycle 31 is stopped in a low water temperature region in which warming-up of the engine 2 is prioritized, and also in a high outside air temperature region in which the load on the compressor 52 is increased. When the exhaust temperature is low and the recovery efficiency is poor, the Rankine cycle 31 is not operated in order to allow the cooling water temperature to be rapidly increased. When the outside air temperature is high and high cooling performance is required, the Rankine cycle 31 is stopped so that sufficient refrigerant and cooling capacity of the condenser 38 can be provided to the refrigeration cycle 51. In FIG. 7B, because the vehicle is a hybrid vehicle, the operation of the Rankine cycle 31 is stopped in an EV running region and a high rotational speed region in which the friction of the expander 37 is increased. It is difficult to provide the expander 37 with a high-efficiency structure such that the friction is low at all rpm's. Thus, in the case of FIG. 7, the expander is configured (through dimensional settings and the like of the various parts of the expander) such that low friction and high efficiency can be achieved in an engine rotational speed region in which the frequency of operation is high.

FIG. 8 is a timing chart of a model illustrating a case in which the hybrid vehicle 1 is accelerated when the rotation of the engine output shaft is being assisted with an expander torque. Right of FIG. 8, the resultant transition of the operating state of the expander 37 is illustrated in an expander torque map. In the areas divided by contour lines in the expander torque map, in the portion (upper left) in which the expander rotational speed is low and the expander upstream pressure is high, the expander torque is the highest. The higher the expander rotational speed and the lower the expander upstream pressure (toward lower right), the smaller the expander torque tends to become. Particularly, the areas with hatching indicate areas in which the expander torque becomes negative and adds to the engine load on the assumption that the refrigerant pump is driven.

Until the driver depresses the accelerator pedal at t1, constant-speed travel continues with the expander 37 producing a positive torque, and the rotation of the engine output shaft is assisted with the expander torque.

After t1, the rotational speed of the expander 37, i.e., the rotational speed of the pump 32 increases in proportion to the engine rotational speed. However, an increase in exhaust temperature or cooling water temperature lags behind the increase in engine rotational speed. Thus, the ratio of the amount of recoverable heat to the amount of refrigerant increased by the increase in rotational speed of the pump 32 is decreased.

Accordingly, as the expander rotational speed increases, the refrigerant pressure upstream of the expander decreases, and the expander torque is decreased.

As the expander torque is decreased, the expander 37 and the refrigerant pump 32 come to be rotated by the driving force from the engine, thereby adding to the engine load. Thus, when the expander torque is not greater than a predetermined torque, the expander clutch 35 is disconnected so as to avoid the phenomenon of dragging of the expander 37 (in which the expander is rotated by the engine, thus adding to engine load).

In FIG. 8, the expander upstream valve 62 is closed at timing t2 before t3 at which the expander clutch 35 is disconnected. At timing t3, there is hardly any difference between the expander upstream pressure and the expander downstream pressure. By closing the expander upstream valve 62 before disconnecting the expander clutch 35, the pressure of the refrigerant upstream of the expander (i.e., the refrigerant that flows into the expander) can be sufficiently decreased, thus preventing excessive rotation of the expander 37 upon disconnection of the expander clutch 35.

After t3, the expander upstream pressure is again increased due to the increase in the amount of heat dissipated by the engine 2. At timing t4, the expander upstream valve 62 is switched from the closed state to the open state, whereby the supply of refrigerant to the expander 37 is resumed. Further, at t4, the expander clutch 35 is connected again, whereby the assisting of the engine output shaft by the expander torque is resumed.

FIG. 9 is a timing chart of a model in which the Rankine cycle is restarted from the stopping of operation thereof with the expander upstream valve 62 closed and the expander clutch 35 disconnected, in a manner different from FIG. 8 (control of t4).

When the driver steps on the accelerator pedal at timing t11, the accelerator opening degree is increased. At t11, operation of the Rankine cycle is stopped. Thus, the expander torque is maintained at zero.

As the engine rotational speed increases from t11, the amount of heat dissipated from the engine 2 is increased. As a result of the increase in the amount of heat dissipated, the temperature of the cooling water that flows into the heat exchanger 36 is increased, whereby the temperature of the refrigerant in the heat exchanger 36 is increased. Because the expander upstream valve 62 is closed, the refrigerant pressure upstream of the expander upstream valve 62, i.e., the expander upstream pressure, is increased due to the increase in the refrigerant temperature caused by the heat exchanger 36 (t11 to t12).

In accordance with the change in operation state, the operation region is switched from the non-Rankine cycle operation region to the Rankine cycle operation region. When the expander upstream valve 62 is switched to the open state and the expander clutch 35 is switched immediately from the disconnected state to the connected state so as to connect the expander 37 to the engine output shaft upon transition to the Rankine cycle operation region, the expander 37 would add the load on the engine 2 and a torque shock would be caused.

In FIG. 9, upon switching to the Rankine cycle operation region, the expander upstream valve 62 is not switched from the closed state to the open state immediately. Namely, the closed state of the expander upstream valve 62 is maintained even after transition to the Rankine cycle operation region.

As the differential pressure between the expander upstream pressure and the expander downstream pressure increases and reaches a predetermined pressure at timing t12, it is determined that the expander 37 can be operated (driven), whereupon the expander upstream valve 62 is switched from the closed state to the open state. When the expander upstream valve 62 is switched to the open state, the refrigerant of a predetermined pressure is supplied to the expander 37, whereby the expander rotational speed is rapidly increased from zero.

As the expander rotational speed increases and reaches the engine rotational speed at t13, the expander clutch 35 is switched from disconnection to connection. When the expander clutch 35 is connected before the rotational speed of the expander 37 is sufficiently increased, the expander 37 adds to the engine load and a torque shock could also be caused. Thus, by connecting the expander clutch 35 at t13 when the rotational speed difference from the engine output shaft is eliminated, the expander 37 can be prevented from adding to the engine load, and also the torque shock by the fastening of the expander clutch 35 can be prevented.

Next, detection of an increase in friction of the expander 37 will be described.

When the rotational friction of the expander 37 is increased, rotation of the expander 37 is interfered, and the efficiency of the Rankine cycle 31 is decreased. Thus, an increase in friction of the expander 37 is detected by the following method.

FIG. 10 is an explanatory chart illustrating a detection operation for detecting whether the friction of the expander 37 is increased.

When the Rankine cycle 31 is in the Rankine cycle operation region, the engine controller 71 releases the expander clutch 35 and opens the expander bypass valve 66 to allow the expander 37 to rotate freely. By detecting the expander rotational speed at this time, the engine controller 71 can detect an increase in friction of the expander 37.

In the Rankine cycle operation region, the expander clutch 35 is connected, and the rotation of the engine output shaft is assisted with the rotation of the expander 37.

Here, the engine controller 71 disconnects the expander clutch 35 and opens the expander bypass valve 66 so as to bypass the flow of refrigerant to the expander 37. As a result, the expander 37 is placed in a no-load state, whereby the pressure of the refrigerant supplied to the expander 37 decreases and the expander 37 freely rotates by inertia.

When the expander clutch 35 is disconnected in the Rankine cycle operation region, when the expander upstream pressure is not less than a predetermined value, or when the difference between the expander upstream pressure and the expander downstream pressure is not less than a predetermined difference, the engine rotation is being assisted with the rotation of the expander 37. When this state is immediately placed in the no-load state, the rotational speed of the expander 37 is temporarily increased by free rotation corresponding to an amount of assist torque due to residual pressure of the refrigerant.

Thereafter, the rotation of the expander 37 is gradually decreased by its own friction, such as from bearings.

The engine controller 71 determines whether the friction of the expander 37 is increased or not by detecting an increase in expander rotational speed when the expander 37 is placed in the no-load state.

Namely, the engine controller 71 determines that the friction is normal when the increase in expander rotational speed is not less than a predetermined value. When the increase in expander rotational speed is less than the predetermined value, the engine controller 71 determines that the friction of the expander 37 is increased. When the increase in friction of the expander 37 is thus detected on the basis of the increase in rotational speed of the expander 37 with the expander clutch 35 disconnected, a high diagnosis accuracy can be obtained for the following reason. Namely, a decrease in rotational speed of the expander 37 that is due to free rotation in a no-residual pressure state does not show much difference depending on the presence or absence of an increase in friction. On the other hand, the increase in rotational speed of the expander 37 in the presence of residual pressure is relatively greatly decreased by even a slight increase in friction, thus readily showing a difference depending on the presence or absence of an increase in friction. In the above detection operation, the bypass valve 66 is opened substantially simultaneously with the disconnecting of the clutch. Thus, the detection of frictional increase on the basis of the increase in rotational speed can be performed while an excessive rotation (excessive rotational speed) of the expander 37 is prevented. The refrigerant pump 32 is a pump driven by the power regenerated by the expander 37. Thus, the excessive rotation is not readily caused when the rotational speed of the expander is increased, and the detection of frictional increase on the basis of an increase in rotational speed can be easily implemented.

When the friction of the expander 37 is increased, the likelihood is high that there is some kind of abnormality in the rotational shaft, bearings, and the like of the expander 37. In this case, the engine controller 71 may issue an alert to the driver to suggest an inspection at a service center. Regarding the predetermined value for the increase in the expander rotational speed, it may be determined that the frictional increase exists when the increase in the expander rotational speed is no more than 90% of a design value.

The expander 37 has a preset allowable rotational speed. Preferably, the engine controller 71 may be previously informed of a refrigerant pressure in a region such that the expander rotational speed will not exceed the allowable rotational speed when the expander clutch 35 is disconnected and the expander rotational speed is increased. Then, when the increase in friction is detected, the engine controller 71 may set the refrigerant pressure for the expander 37 to the previously informed pressure.

For example, an upper-limit pressure in a region in which the expander 37 does not reach the allowable rotational when the speed expander 37 has no load is determined in advance by an experiment or the like. Then, when the detected expander upstream pressure is not greater than the upper-limit pressure (i.e., when lowered to the upper-limit pressure or below), the engine controller 71 may disconnect the expander clutch 35.

Preferably, an upper-limit pressure difference between the upstream pressure and the downstream pressure of the expander in a region such that the expander 37 does not reach the allowable rotational speed when the expander 37 has no load may be determined by an experiment or the like. Then, when the detected difference between the expander upstream pressure and the expander downstream pressure is not greater than the upper-limit pressure difference (i.e., when lowered to the upper-limit pressure difference or below), the engine controller 71 may disconnect the expander clutch 35.

FIG. 11 is an explanatory chart of another example of the detection operation for detecting whether the friction of the expander 37 is increased.

As described above, in the Rankine cycle operation region, the engine controller 71 connects the expander clutch 35 so as to assist the rotation of the engine output shaft with the rotation of the expander 37.

When the engine controller 71 disconnects the expander clutch 35, the expander 37 is placed in the no-load state, so that the expander rotational speed increases due to the refrigerant of the Rankine cycle 31.

At this time, the engine controller 71 detects the amount of increase in the rotational speed of the expander 37 and determines whether the friction of the expander 37 is increased.

Meanwhile, the engine controller 71 detects the expander rotational speed and determines whether the expander rotational speed is not less than a predetermined rotational speed having a margin with respect to the preset allowable rotational speed. When the predetermined rotational speed is reached or exceeded, the engine controller 71, in order to prevent the expander 37 from reaching the allowable rotational speed, opens the expander bypass valve 66 so as to stop the supply of refrigerant to the expander 37. After the expander bypass valve 66 is opened, the expander 37 is not supplied with the driving force due to the refrigerant, and therefore the rotation of the expander 37 gradually decreases due to its own friction.

Thus, according to the method illustrated in FIG. 11, compared with the case in which the expander clutch 35 is disconnected and the expander bypass valve 66 is opened simultaneously as described above with reference to FIG. 10, the amount of increase in expander rotational speed is greater. Accordingly, the increase in expander rotational speed can be determined more readily, and the increase in the friction of the expander 37 can be determined more readily.

As described with reference to FIG. 8, the engine controller 71, when the expander torque is not greater than a predetermined value, disconnects the expander clutch 35 so as to avoid the phenomenon of dragging of the expander 37.

At this time, the expander bypass valve 66 may be opened at the timing of t2 prior to t3 when the expander clutch 35 is disconnected. When the detection of frictional increase of the expander is not performed, the expander bypass valve 66 may be opened prior to disconnecting the expander clutch 35. In this way, the refrigerant pressure difference between the upstream and downstream of the expander can be sufficiently decreased, whereby the excessive rotation of the expander 37 upon disconnection of the expander clutch 35 can be prevented.

As described above, according to the embodiment of the present invention, an increase in expander rotational speed is detected when, in the Rankine cycle operation region, the expander clutch 35 is disconnected and the expander 37 has no load.

In the above configuration, an increase in the friction of the expander 37 can be detected on the basis of an increase in expander rotational speed when the expander 37 has no load. Particularly, because there is no need to use a torque sensor, such as a strain sensor, an increase in size of the expander 37 or cost can be avoided. In the state in which there is residual pressure, the increase in rotational speed of the expander 37 is relatively greatly decreased even by a slight increase in friction. Thus, a difference is readily caused depending on the presence or absence of the increase in friction, whereby a high diagnosis accuracy can be obtained. When the bypass valve 66 is opened at the time of clutch disconnection, the detection of frictional increase on the basis of an increase in rotational speed can be performed while excessive rotation (excessive rotational speed) of the expander 37 is prevented.

When the expander 37 is placed in the no-load state, the expander bypass valve 66 is opened to lower the pressure of the refrigerant that drives the expander 37 so that the expander rotational speed of the expander 37 does not exceed the allowable rotational speed of the expander 37. In this way, the expander 37 is prevented from being supplied with driving force in the no-load state, whereby the excessive rotation of the expander 37 is prevented and a failure is forestalled.

When the expander clutch 35 is disconnected, the expander upstream pressure of the expander 37, or the difference between the expander upstream pressure and the expander downstream pressure is detected. When the expander upstream pressure is not greater than a predetermined pressure, or when the pressure difference is not greater than a predetermined pressure difference, the expander clutch 35 is disconnected. Thus, the expander 37 is prevented from being supplied with excessive driving force in the no-load state, whereby excessive rotation of the expander 37 is prevented and a failure is forestalled.

When the detection of the increase in friction of the expander is not performed, such as when the expander clutch 35 is disconnected by a decrease in expander torque or the like in the Rankine cycle operation region, the expander bypass valve 66 is opened in advance so as to decrease the pressure of the refrigerant for driving the expander. In this way, excessive rotation of the expander is prevented, and a failure is forestalled.

While the foregoing embodiment of the present invention has been described with reference to a hybrid vehicle as an example, the present invention is not limited to such embodiment. The present invention may be applied to a vehicle only equipped with the engine 2. The engine 2 may be a gasoline or diesel engine.

While an embodiment of the present invention has been described, the embodiment merely indicates a part of an application example of the present invention, and is not intended to limit the technical scope of the present invention to the specific configuration of the embodiment.

This application claims priority from Japanese Patent Application No. 2011-216765 filed with the Japan Patent Office on Sep. 30, 2011, the entire contents of which are hereby incorporated by reference.

The invention claimed is:

1. A waste heat recovery system comprising:
   a Rankine cycle including:
      a heat exchanger that recovers waste heat from an engine with a refrigerant,
      an expander that produces power by using the refrigerant that exits the heat exchanger,
      a condenser that condenses the refrigerant that exits the expander, and
      a refrigerant pump that supplies the refrigerant that exits the condenser to the heat exchanger;
   a power transmission mechanism including a belt, a pump pulley, and a crank pulley, that transmits the power regenerated by the expander to the engine; and
   an engine controller, wherein:
   the power transmission mechanism further includes an expander clutch to disconnect and connect the power being transmitted from the expander to the engine,
   the expander includes a rotational speed sensor that detects a rotational speed of the expander, and
   the engine controller, when the expander clutch is disconnected, determines an increase in friction of the expander based on an increase in the rotational speed of the expander being detected by the rotational speed sensor.

2. The waste heat recovery system according to claim 1, wherein the Rankine cycle includes:
   a bypass passage that allows the refrigerant to bypass the expander, and
   a bypass valve that adjusts the refrigerant bypassing via the bypass passage,
   wherein the engine controller, when the expander clutch is disconnected, controls the bypass valve to adjust the refrigerant bypassing via the bypass passage.

3. The waste heat recovery system according to claim 2, wherein the engine controller simultaneously controls the bypass valve as the expander clutch is being disconnected.

4. The waste heat recovery system according to claim 2, wherein, when the engine controller determines that detection of the increase in friction of the expander is not needed the engine controller disconnects the expander clutch after the engine controller controls the bypass valve to cause the bypass passage to conduct during regeneration of the power by the expander.

5. The waste heat recovery system according to claim 4, wherein the refrigerant pump is a pump driven by the power regenerated by the expander.

6. The waste heat recovery system according to claim 1, wherein:
   the Rankine cycle includes:
      a bypass passage that allows the refrigerant to bypass the expander, and
      a bypass valve that adjusts the refrigerant bypassing via the bypass passage, and
   the engine controller, when the expander clutch is disconnected, controls the bypass valve to cause the bypass passage to conduct so as to make the rotational speed of the expander not greater than an allowable rotational speed of the expander.

7. The waste heat recovery system according to claim 1, further comprising a pressure sensor that detects a refrigerant pressure upstream of the expander,
   wherein the expander clutch is disconnected by the engine controller when the refrigerant pressure upstream of the expander detected by the pressure sensor is not greater than a predetermined pressure.

8. The waste heat recovery system according to claim 1, further comprising a pressure difference sensor that detects a pressure difference between pressures of the refrigerant upstream and downstream of the expander,
   wherein the expander clutch is disconnected by the engine controller when the pressure difference between the refrigerant pressures upstream and downstream of the expander detected by the pressure difference sensor is not greater than a predetermined pressure difference.

* * * * *